UNITED STATES PATENT OFFICE.

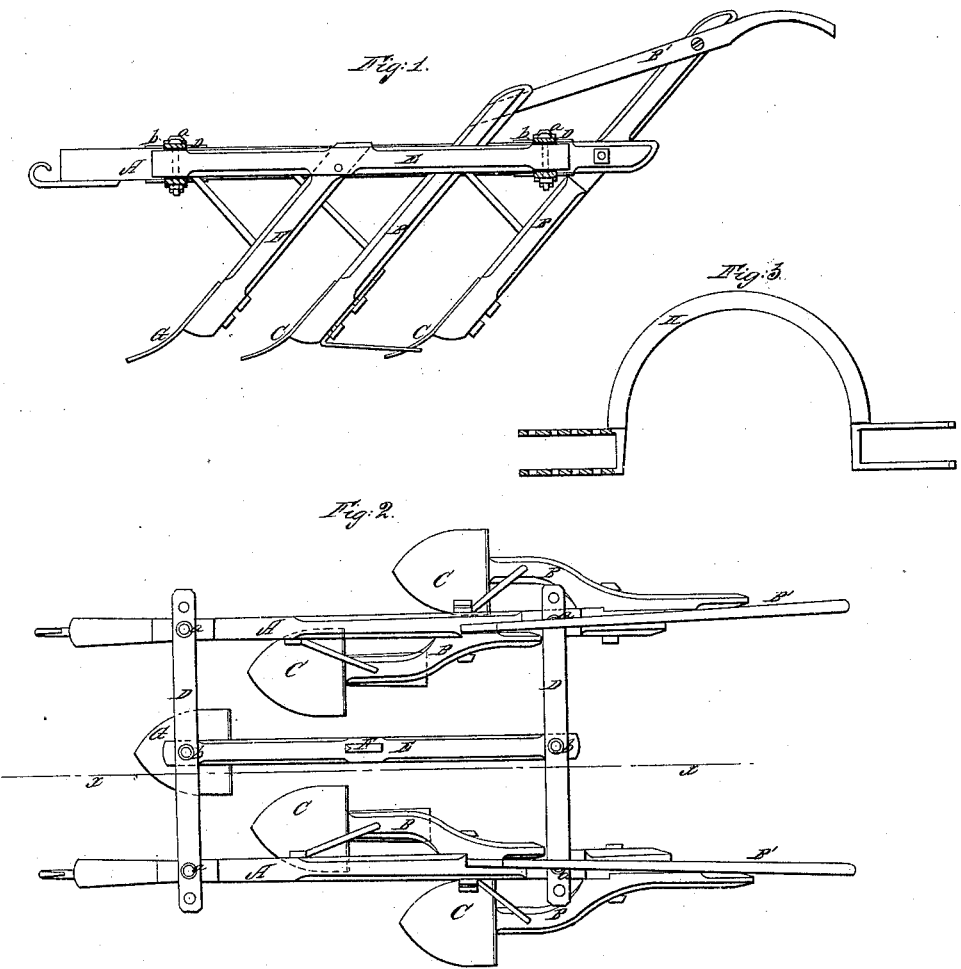

EDWARD PRATT, OF GRAND DETOUR, ILLINOIS.

IMPROVEMENT IN CULTIVATORS.

Specification forming part of Letters Patent No. 44,747, dated October 18, 1864.

*To all whom it may concern:*

Be it known that I, EDWARD PRATT, of Grand Detour, in the county of Ogle and State of Illinois, have invented a new and Improved Cultivator; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, a detached view of a curved bar pertaining to the same.

Similar letters of reference indicate corresponding parts in the several figures.

This invention relates to a new and improved cultivator designed for plowing corn and other crops grown in hills or drills, and also for loosening land, &c.

The invention consists in connecting together two plow-beams arranged in such a manner that each beam will have an independent movement, or one to a certain extent independent of the other, whereby the implement is placed more under the control of the operator than usual, and managed with less labor and with less fatigue to the team.

To enable those skilled in the art to fully understand and construct my invention, I will proceed to describe it.

A A represent two plow-beams, each of which has two standards, B B, attached with shovel-plows C C at their lower ends. The standards B B are curved, and are attached to opposite sides of the beams A, so as to throw the plows C C out of line with each other, as shown in Fig. 2, the two forward plows being nearer together than the two rear ones. The two beams A A are connected together by cross-bars D D, the ends of the latter being attached to the beams by pivot-bolts $a$. To the centers of the cross-bars D D a longitudinal bar, E, is attached by pivot-bolts $b$, and this bar E has a standard, F, attached to it, having a shovel-plow, G, at its lower end. The rear standards, B, of the beams A A extend upward to form supports for handles B' B' for the operator to grasp and guide the implement as it is drawn along.

One draft-animal is attached to each beam A, and it will be seen from the above description that each beam A, in consequence of being connected by the cross-bars D D, as shown, is allowed a certain independent movement longitudinally, and may therefore be managed and operated with facility in case of meeting with obstructions, and the implement is not so liable to be strained or racked as when the rigid frames are used, nor the team so much fatigued.

In plowing or cultivating corn I remove the bars D D and put on curved metal bars H, as shown in Fig. 3, and I remove the central bar, E. The curved bars H clear the corn and prevent it from being broken down and injured. The bars D D and central bar, E, are used in loosening the earth previous to the sowing of the seed, &c.

Having thus described my invention, what I claim as new, and desire to secure by Letters Patent, is—

The two plow-beams A A, connected together at a proper distance apart by means of bars D or H, attached to the beams A by pivot-bolts $a$, to admit of an independent longitudinal movement of the beams A, the latter being used either with or without the central bar, E, and its plow G, and all arranged substantially as and for the purpose herein set forth.

EDWARD PRATT.

Witnesses:
EDMUND WRIGHT,
DANIEL L. CUSHING.